Figures 1, 2:
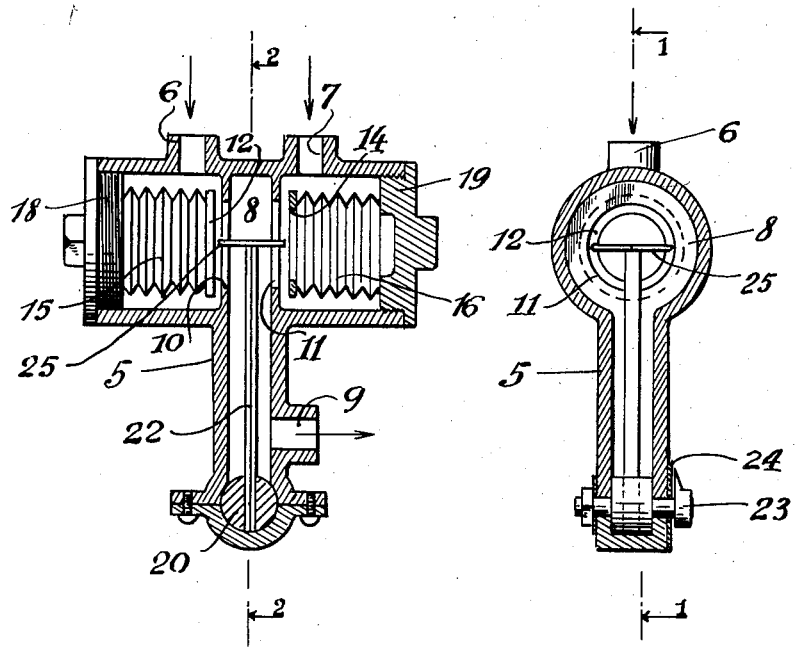

Sept. 8, 1953

L. TROY 2,651,467

THERMOSTATIC MIXING VALVE

Filed Dec. 8, 1951

Leonard Troy
INVENTOR

BY
Ivan E. C. Konigsberg
ATTORNEY

Patented Sept. 8, 1953

2,651,467

UNITED STATES PATENT OFFICE 2,651,467

THERMOSTATIC MIXING VALVE

Leonard Troy, Clarks Summit, Pa.

Application December 8, 1951, Serial No. 260,598

1 Claim. (Cl. 236—12)

The object of this invention is to provide an improved thermostatic valve of very simple design and construction characterized by the fact that the bi-metallic member or thermostat performs no other function than that of moving the valve members away from the valve ports as distinguished from prior valves in which the thermostat perform work other than merely moving the valve members.

In the accompanying drawing Fig. 1 is a sectional view of the valve according to this invention taken substantially on the line 1—1 of Fig. 2. The latter is a sectional view of the valve taken substantially on the line 2—2 of Fig. 1.

The valve comprises a valve casing 5 of T-formation having an inlet 6 for the warm component and an inlet 7 for the cold component. The inlets lead to a valve mixing chamber 8 having an outlet at 9. The mixing chambber has two circular valve ports 10 and 11 adapted to be closed by annular or ring valves 12 and 14, respectively. The valves are carried by hollow bellows 15 and 16 as shown. The bellows are secured to screw plugs 18 and 19, respectively, which are screwed into the valve casing to provide tight closure of the mixing chamber. The springiness of the bellows tends to move the ring valves toward the annular ports to close them.

At the bottom of the casing a shaft 20 is mounted to oscillate in response to the movements of the thermostat 22. The shaft carries a pointer handle 23 which registers with a scale disk 24. The latter carries a thermometer scale, not shown. The thermostat carries at the top a loop 25 adapted to engage either of the two ring valves.

The valve is shown in balanced position with both ports 10 and 11 open. If now the temperature of the fluid passing through the valve gets above the predetermined temperature for which the valve is set by operation of the pointer handle 23, the thermostat 22 will move toward the ring valve 14 to open for a greater inflow of the cold component through the inlet 7. At the same time the bellows 15 will move the other ring valve 12 nearer to the port 10 to decrease the inflow of the warm component through the inlet 6, and vice versa.

It will be seen that the only work which the thermostat is called upon to perform is to overcome the springiness of the bellows which themselves move the valves nearer to the valve ports, the bellows being under the same internal and external pressure.

The construction is further advantageous in that repairs, adjustments, cleaning, and the like, may be easily made by unscrewing the screw plugs from the valve casing.

I claim:

A thermostatically operated valve comprising a valve casing of vertically disposed T-formation forming a mixing chamber within the vertical stem of said casing and opposed valve chambers in the horizontal head of the casing, one valve chamber in each end of said horizontal head, an inlet for admitting a cold component to one of said valve chambers, a second inlet for admitting a warm component to the other valve chamber, an annular valve port between each of said valve chambers and said mixing chamber, ring valves for opening and closing the valve ports, hollow bellows supporting said valves and normally urging them to close the said valve ports, respectively, said valve ports, valves and bellows being in axially alined positions within the said casing head, an outlet near the bottom of said mixing chamber, a thermostat rockable upon a shaft below said outlet and adapted to engage either one of the said ring valves to move it away from its respective valve port to regulate the volumes of warm and cold componens passing through said valves, means for supporting the said shaft and detachable screw plugs in the ends of said horizontal casing head for supporting the said hollow bellows and the said valves, said inlets being at an angle to the horizontal axes of the said valves.

LEONARD TROY.

References Cited in the file of this patent

UNITED STATES PATENTS

| Number | Name | Date |
|---|---|---|
| 1,153,547 | Finney | Sept. 14, 1915 |
| 1,724,504 | Murdock | Aug. 13, 1929 |
| 2,107,551 | Simpson | Feb. 8, 1938 |
| 2,287,294 | Coile | June 23, 1942 |
| 2,430,133 | Muffly | Nov. 4, 1947 |